United States Patent
Aizawa

(10) Patent No.: US 10,036,522 B2
(45) Date of Patent: Jul. 31, 2018

(54) VEHICULAR LAMP

(71) Applicant: Koito Manufacturing Co., Ltd., Minato-ku, Tokyo (JP)

(72) Inventor: Daisuke Aizawa, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 142 days.

(21) Appl. No.: 14/025,463

(22) Filed: Sep. 12, 2013

(65) Prior Publication Data
US 2014/0078764 A1 Mar. 20, 2014

(30) Foreign Application Priority Data

Sep. 14, 2012 (JP) ................................ 2012-202640

(51) Int. Cl.
| F21S 41/00 | (2018.01) |
| F21S 41/24 | (2018.01) |
| B60Q 1/00 | (2006.01) |
| F21S 43/27 | (2018.01) |
| F21S 43/237 | (2018.01) |
| F21S 43/245 | (2018.01) |
| F21S 43/247 | (2018.01) |

(52) U.S. Cl.
CPC ............ F21S 41/24 (2018.01); B60Q 1/0047 (2013.01); F21S 43/237 (2018.01); F21S 43/245 (2018.01); F21S 43/247 (2018.01); F21S 43/27 (2018.01)

(58) Field of Classification Search
CPC ............... F21S 48/1127; F21S 48/1195; F21S 48/1208; F21S 48/211; F21S 48/10; F21S 48/2225; F21S 48/1241; F21S 41/24; B60Q 1/0011; B60Q 1/0029; B60Q 1/0035; B60Q 1/0041–1/0047

USPC .................... 362/509–511, 555, 487, 498
See application file for complete search history.

(56) References Cited

U.S. PATENT DOCUMENTS

| 2010/0321948 | A1* | 12/2010 | Ohno ................... F21S 48/1159 362/538 |
| 2011/0063115 | A1* | 3/2011 | Kishimoto ..................... 340/600 |
| 2011/0242831 | A1* | 10/2011 | Okui ..................... F21S 48/115 362/511 |
| 2012/0069592 | A1 | 3/2012 | Natsume et al. |
| 2013/0235604 | A1* | 9/2013 | Ukai ..................... B60Q 3/004 362/511 |

FOREIGN PATENT DOCUMENTS

| CN | 101907256 A | 12/2010 |
| JP | 2012-48845 A | 3/2012 |

* cited by examiner

*Primary Examiner* — Sean Gramling
*Assistant Examiner* — Gerald J Sufleta, II
(74) *Attorney, Agent, or Firm* — DLA Piper LLP (US)

(57) ABSTRACT

A clearance lamp (20) including an LED, a light guide (23) that receives light from the LED on its one end surface and guides the light therein to emit the light forward from the emitting surface (23c) extending along the extending direction of the light guide; and a back surface portion (26b) of a clearance lamp body (26) to which the light guide is attached. The light guide includes a bar-shaped light guide body (23b), a first extended portion (23f) extended downward from the light guide body, a second extended portion (23g) extended rearward from an extended end of the first extended portion, and a fixing portion (23h) that is formed in the second extended portion to fix the light guide to the back surface portion of the clearance lamp body.

5 Claims, 4 Drawing Sheets

VEHICULAR LAMP

BACKGROUND OF THE INVENTION

1. Field of the Invention

The present invention relates to vehicular lamps and more particularly to vehicular lamps that uses a light guide.

2. Description of the Related Art

Conventionally, combination head lamps incorporating a low beam lamp, a high beam lamp, a clearance lamp, etc. in a lamp chamber are known in the art. In such combination head lamps, a projector-type or reflection-type lamp, for instance, is used as the low beam lamp and the high beam lamp, and a reflection-type lamp is commonly used as the clearance lamp. In a clearance lamp proposed in recent years, a light guide is employed that receives light emitted from the light source such as LED on its one end surface and guides the light therein to emit the light to the outside (See, e.g., Japanese Patent Application Laid-Open (Kokai) No. 2012-48845 for a vehicular lamp that uses a light guide).

In the vehicular lamp disclosed in Japanese Patent Application Laid-Open (Kokai) No. 2012-48845, the light guide has a tongue-shaped extended portion that extends rearward and parallel to the extending direction, and it is fixed to the light-guide attaching portion by concavo-convex lance engagement between the tongue-shaped extended portion and an engagement portion provided in the light-guide attaching portion.

However, in the vehicular lamp disclosed in Japanese Patent Application Laid-Open (Kokai) No. 2012-48845, the fixing/supporting structure of the light guide such as the tongue-shaped extended portion may be seen from the outside of the lamp, and there is room for improvement in appearance of the vehicular lamp.

BRIEF SUMMARY OF THE INVENTION

The present invention was developed in view of the situation described above, and it is an object of the present invention to provide a vehicular lamp that has an improved appearance.

In order to solve the problem with the conventional vehicular lamp, a vehicular lamp according to one aspect of the present invention includes: a light-source mount portion on which a light source is mounted; a light guide that receives light from the light source on one end surface of the light guide, and guides the light therein to emit the light forward from the emitting surface extending along the extending direction of the light guide; and a light-guide attaching portion to which the light guide is attached; and in this structure, the light guide is comprised of a bar-shaped light guide body, a first extended portion extended downward or upward from the light guide body, a second extended portion extended rearward from the extended end of the first extended portion, and a fixing portion that is formed in the second extended portion to fix the light guide to the light-guide attaching portion.

The above-described vehicular lamp of the present invention can be further comprised of a concealing portion that conceals the first extended portion, the second extended portion, and the fixing portion.

The above-described light-guide attaching portion can be a reflective member that is provided behind the light guide body to reflect the light from the light guide body.

As seen from the above, according to the present invention, the vehicular lamp provides an improved appearance.

DETAILED DESCRIPTION OF THE INVENTION

Hereafter, a vehicular lamp according to embodiments of the present invention will be described in detail with reference to the accompanying drawings. In the description below, the terms representing the directions such as "upper," "lower," "front," "rear," "left," and "right" refer to the directions in an attitude of the vehicular lamp mounted on a vehicle.

Figure 1:
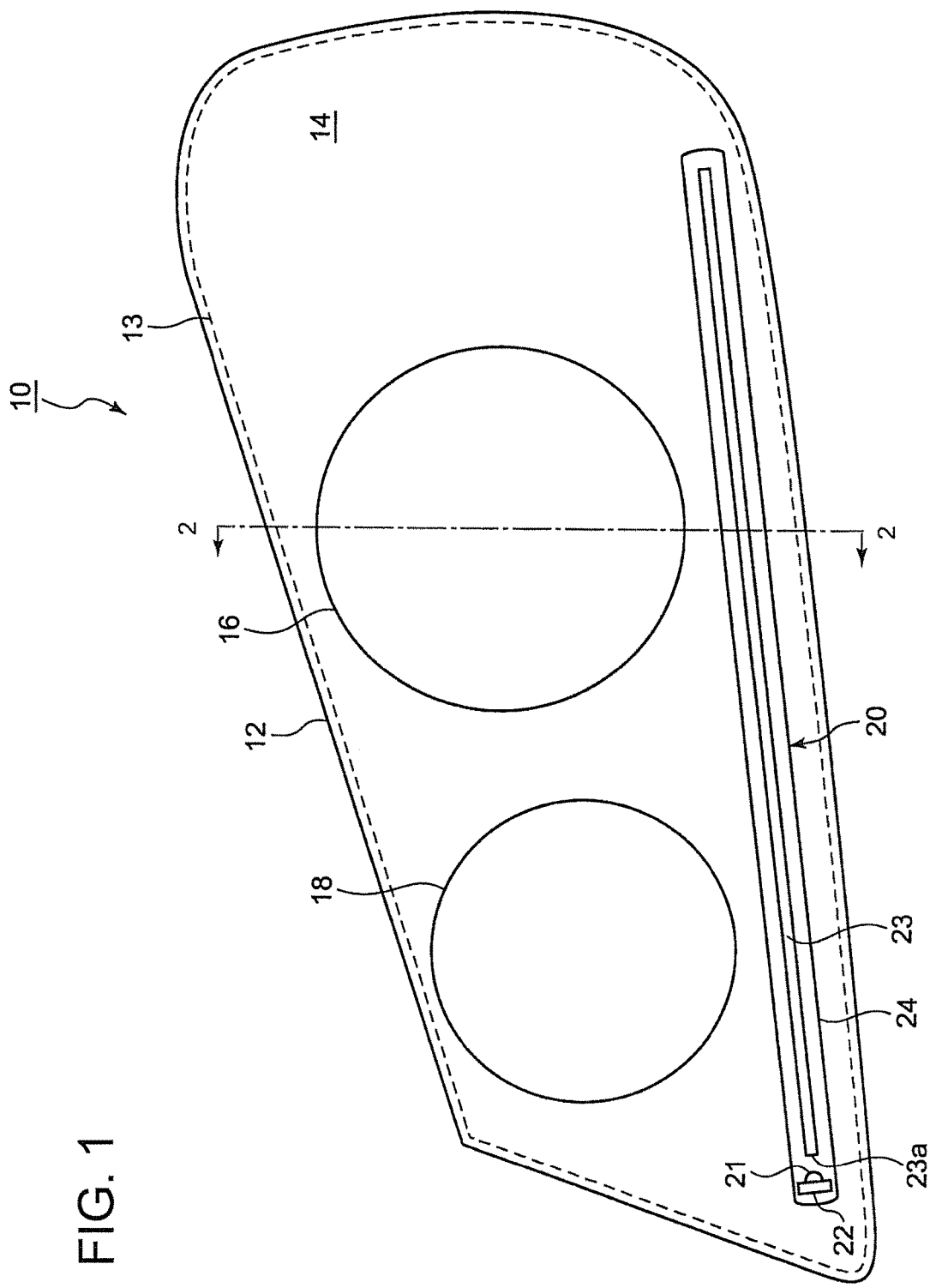
FIG. 1 is a schematic front view illustrating a vehicular headlamp according to one embodiment of the present invention.
Figure 2:
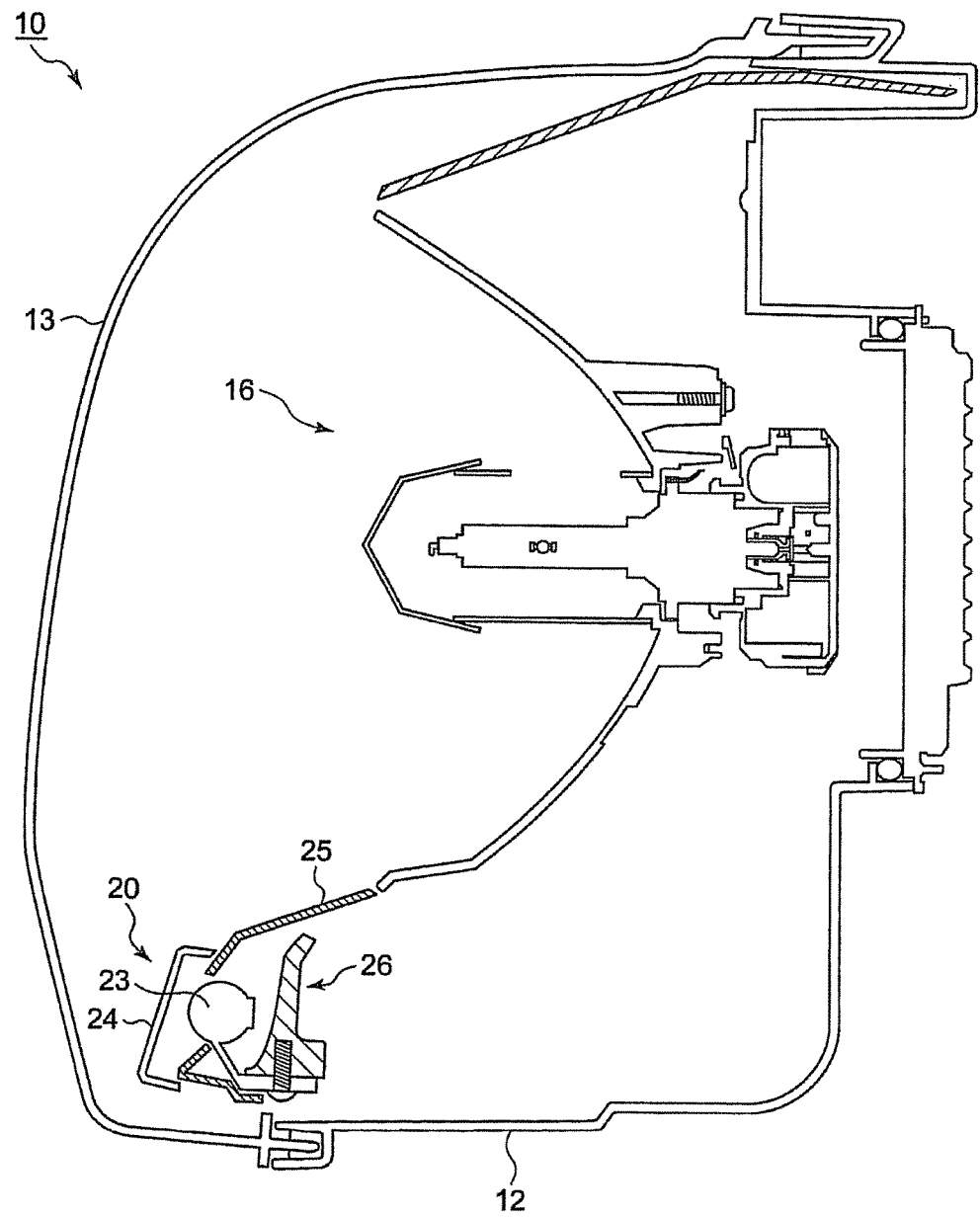
FIG. 2 is a cross-sectional view of the vehicular headlamp taken along the line 2-2 in FIG. 1.

FIG. 1 is a schematic front view illustrating a vehicular headlamp 10 according to one embodiment of the present invention. FIG. 2 is the line 2-2 cross-sectional view of the vehicular headlamp 10 shown in FIG. 1.

As seen from FIGS. 1 and 2, the vehicular headlamp 10 is a combination headlamp accommodating a low beam lamp 16, a high beam lamp 18, and a clearance lamp 20 in the lamp chamber 14 formed by a lamp body 12 and a transparent outer cover 13.

As shown in FIG. 1, the low beam lamp 16 and the high beam lamp 18 are provided in the lamp chamber 14 next to each other in the lateral direction of a vehicle. Although the low beam lamp 16 in FIG. 2 is a reflection-type lamp, the type of the low beam lamp 16 is not particularly limited, and a reflection-type or projector type vehicular lamp, for example, can be used. Since the reflection-type low beam lamp is known in the art, detailed description thereof will be omitted. The type of the high beam lamp 18 is also not particularly limited, and, for example, a reflection-type or projector type vehicular lamp can be used.

As seen from FIG. 1, the clearance lamp 20 is provided below the low beam lamp 16 and the high beam lamp 18, and as shown in FIGS. 1 and 2, the clearance lamp 20 is formed by an LED 21 which is a light source, a circuit board 22 which is a light-source mount portion on which the LED 21 is mounted, a bar-shaped light guide 23, an inner lens 24, and an extension 25.

The light guide 23 is a bar-shaped member formed by injection-molding a transparent resin such as acrylic or polycarbonate. As seen from FIG. 1, the light guide 23 is molded in a linear shape, and it extends along the lower edge portion of the lamp body 12. One end surface of the light guide 23 serves as an incident surface 23a through which the light from the LED 21 enters. The light guide 23 guides therein the light entered through the incident surface 23a, and it emits the light forward from the emitting surface extending along the extending direction of the light guide 23. An additional LED can be provided so that the light is also incident on or enters through the other end surface of the light guide 23.

The LED 21 is a light source that supplies light to the light guide 23. The LED 21 is mounted on the circuit board 22 so as to face the incident surface 23a of the light guide 23.

The extension 25 is a resin molded component, and it has an aluminized surface and serves to cover the gap between each of the low beam lamp 16 and the high beam lamp 18 and the lamp body 12. As shown in FIG. 2, the extension 25 is formed in the shape of a container that opens in its front surface, and is formed as a lamp body of the clearance lamp 20 which is capable of accommodating the light guide 23 (hereinafter referred to as the "clearance lamp body 26"). The inner lens 24 is provided so as to cover the opening in the front surface of the clearance lamp body 26. The inner lens 24 and the clearance lamp body 26 are extended along the shape of the light guide 23.

Figure 3:
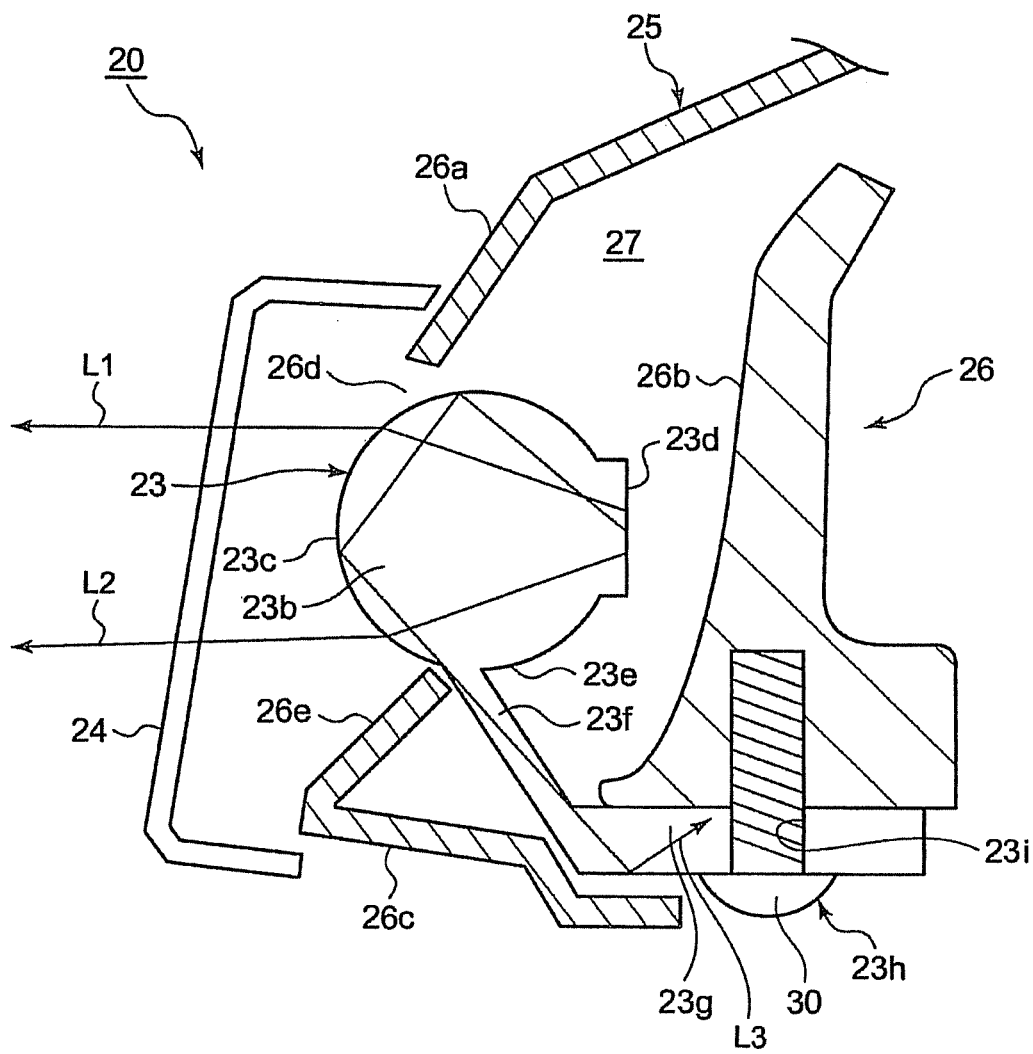
FIG. 3 is an enlarged cross-sectional view of a clearance lamp according to one embodiment of the present invention.

FIG. 3 is an enlarged cross-sectional view of the clearance lamp 20. As shown in FIG. 3, the light guide 23 is supported substantially in the center of a lamp chamber 27 formed by the inner lens 24 and the clearance lamp body 26. A fixing/supporting structure of the light guide 23 will be described later.

The light guide 23 is mainly formed by a bar-shaped light guide body 23b. As seen from FIG. 3, the light guide body 23b has a generally circular cross section along the direction perpendicular to the extending direction thereof. In the shown embodiment, the portion on the front surface side of the peripheral surface of the bar-shaped light guide body 23b functions as an emitting surface 23c that emits light to the front of the lamp. The portion on the rear surface side of the peripheral surface of the light guide body 23b has a plurality of steps 23d formed along the extending direction of the light guide so as to reflect, toward the emitting surface 23c, a part of light traveling in the light guide body 23b. The shape, size, pitch, etc. of the steps 23d are designed so that light having intensity required as a clearance lamp is radiated in the forward direction (to the front) from the emitting surface 23c.

The clearance lamp body 26 is mainly formed by an upper surface portion 26a located above the light guide body 23b, a back surface portion 26b located behind the light guide body 23b, and a lower surface portion 26c located below the light guide body 23b. An opening 26d is formed between the upper surface portion 26a and the lower surface portion 26c, and the emitting surface 23c of the light guide 23 is located in this opening 26d.

Although the upper surface portion 26a, the back surface portion 26b, and the lower surface portion 26c are shown as separate portions in the cross-sectional view of FIG. 3, these portions are formed into an integral member in the front end of the extension 25. Each of the upper surface portion 26a, the back surface portion 26b, and the lower surface portion 26c has an aluminized inner surface that reflects a part of light emitted from the light guide body 23b.

In the above-described clearance lamp 20, light is emitted from the LED 21 when a current is supplied to the LED 21 (see FIG. 1). The light emitted from the LED 21 is incident on or enters into the light guide body 23b through the incident surface 23a (see FIG. 1). The light incident on or entered in the light guide body 23b travels in the light guide body 23b while being repeatedly subjected to total reflection.

While the light travels in the light guide body 23b, the light incident on the steps 23d on the rear surface side of the light guide body 23b is reflected toward the emitting surface 23c by the steps 23d, and is emitted from the emitting surface 23c. Since similar reflection occurs at each one of the steps 23d formed along the extending direction of the light guide body 23b, light is emitted from substantially the entire area of the emitting surface 23c along the extending direction of the light guide body 23b. The light emitted from the emitting surface 23c is radiated to the front of the lamp through the inner lens 24 (shown by light rays L1, L2 in FIG. 3).

A part of the light traveling in the light guide body 23b is emitted to the outside also from surfaces other than the emitting surface 23c. A part of this emitted light is reflected by the inner surfaces of the upper surface portion 26a, the back surface portion 26b, and the lower surface portion 26c and radiated to the front of the lamp.

Next, the fixing/supporting structure of the light guide 23 will be described. As shown in FIG. 3, the light guide 23 includes as the fixing/supporting structure to a light-guide attaching portion a first extended portion 23f, a second extended portion 23g, and a fixing portion 23h.

The first extended portion 23f is a plate piece that extends downward from a lower surface portion 23e of the light guide body 23b. In FIG. 3, the first extended portion 23f extends obliquely downward toward the rear from the lower surface portion 23e of the light guide body 23b; however, the extending direction of the first extended portion 23f is not particularly limited as long as it extends downward. For example, the first extended portion 23f can extend vertically downward from the lower surface portion 23e of the light guide body 23b.

The second extended portion 23g is a plate piece that extends rearward from the extended end of the first extended portion 23f. In FIG. 3, the second extended portion 23g extends horizontally toward the rear from the extended end of the first extended portion 23; however, the extending direction of the second extended portion 23g is not particularly limited as long as it extends toward the rear. For example, the second extended portion 23g can extend obliquely upward toward the rear from the extended end of the first extended portion 23f.

The fixing portion 23h is a portion formed in the second extended portion 23g, and it functions to fix the light guide 23 to the light-guide attaching portion. In the shown embodiment, the back surface portion 26b of the clearance lamp body 26 is the light-guide attaching portion. The fixing portion 23h includes a bolt 30 and a through hole 23i formed in the second extended portion 23g so that the bolt 30 is inserted therethrough. The fixing method to the light-guide attaching portion is not limited to the method that uses a bolt, and various fixing methods such as, crimping and welding can be employed. In the shown embodiment, the second extended portion 23g of the light guide 23 contacts the bottom surface of the back surface portion 26b of the clearance lamp body 26. The second extended portion 23g is fixed to the back surface portion 26b with the bolt 30, whereby the light guide 23 is fixed and supported in the clearance lamp body 26.

The first extended portion 23f, the second extended portion 23g, and the through hole 23i described above can be integrally molded to the light guide body 23b by using a transparent resin such as acrylic or polycarbonate.

In the structure described above, the lower surface portion 26c of the clearance lamp body 26 has a function to conceal the first extended portion 23f, the second extended portion 23g, and the fixing portion 23h. As shown in FIG. 3, the lower surface portion 26c of the clearance lamp body 26 includes a concealing portion 26e located in front of the first extended portion 23f of the light guide 23. The concealing portion 26e extends from the front end of the lower surface portion 26c to the lower surface portion 23e of the light guide body 23*b*, thus concealing the first extended portion 23*f*, the second extended portion 23*g*, and the fixing portion 23*h*.

In the shown embodiment, the back surface portion 26*b* of the clearance lamp body 26 is also provided so as to at least partially conceal the second extended portion 23*g* and the fixing portion 23*h*.

More specifically, in the case of using a fixing/supporting structure in which the extended portion is formed in the shape of a plate piece that extends extending rearward from the upper surface portion or the lower surface portion of the light guide body and a fixing portion is provided in this extended portion (see, e.g., Japanese Patent Application Laid-Open (Kokai) No. 2012-48845 described above), a region where the extended portion is provided appears lit in a dot pattern, which may impair the appearance. This is because the light traveling in the light guide body enters the extended portion, and is emitted from the extended portion to the light guide body after being reflected in the extended portion.

However, in the vehicular headlamp 10 according to the present embodiment, the light guide 23 is fixed and supported on the light-guide attaching portion by using the first extended portion 23*f* extending downward from the light guide body 23*b*, the second extended portion 23*g* extending rearward from the first extended portion 23*f*, and the fixing portion 23*h* provided in the second extended portion 23*g*. Even if such a fixing/supporting structure is used, there is light that enters the first extended portion 23*f* from the light guide body 23*b*, e.g., a light ray L3 shown in FIG. 3. In the shown embodiment of the present invention, however, since the extended portion is bent between the first extended portion 23*f* and the second extended portion 23*g*, light entering the first extended portion 23*f* is refracted by the bent portion, and a part of the light is emitted to the outside. Accordingly, even if the light reflected by the second extended portion 23*g* is emitted from the first extended portion 23*f* to the light guide body 23*b*, the intensity of this light is very low.

In the shown embodiment, since the first extended portion 23*f* extends downward from the light guide body 23*b*, the light emitted from the first extended portion 23*f* is emitted upward. Accordingly, the light emitted from the first extended portion 23*f* cannot be easily seen from the outside.

As described above, according to the embodiment of the present invention described above, light emission in a dot pattern is less likely to be seen. The presence of the fixing/supporting structure is, therefore, less likely to be recognized from the outside, whereby the appearance of the clearance lamp 20 and the appearance of the vehicular headlamp 10 are both improved.

In the shown embodiment described above, the lower surface portion 26*c* of the clearance lamp body 26 is provided with the concealing portion which conceal the first extended portion 23*f*, the second extended portion 23*g*, and the fixing portion 23*h*. This makes it more difficult to see the fixing/supporting structure of the light guide 23 from the outside of the clearance lamp 20, and the appearance of the clearance lamp 20 and the appearance of the vehicular headlamp 10 both improve further.

According to the vehicular headlamp 10 of the shown embodiment, the back surface portion 26*b* of the clearance lamp body 26 which is a reflective member provided behind the light guide body 23*b* is the light-guide attaching portion. This can make it more difficult for the fixing/supporting structure of the light guide 23 to be seen.

Figure 4:
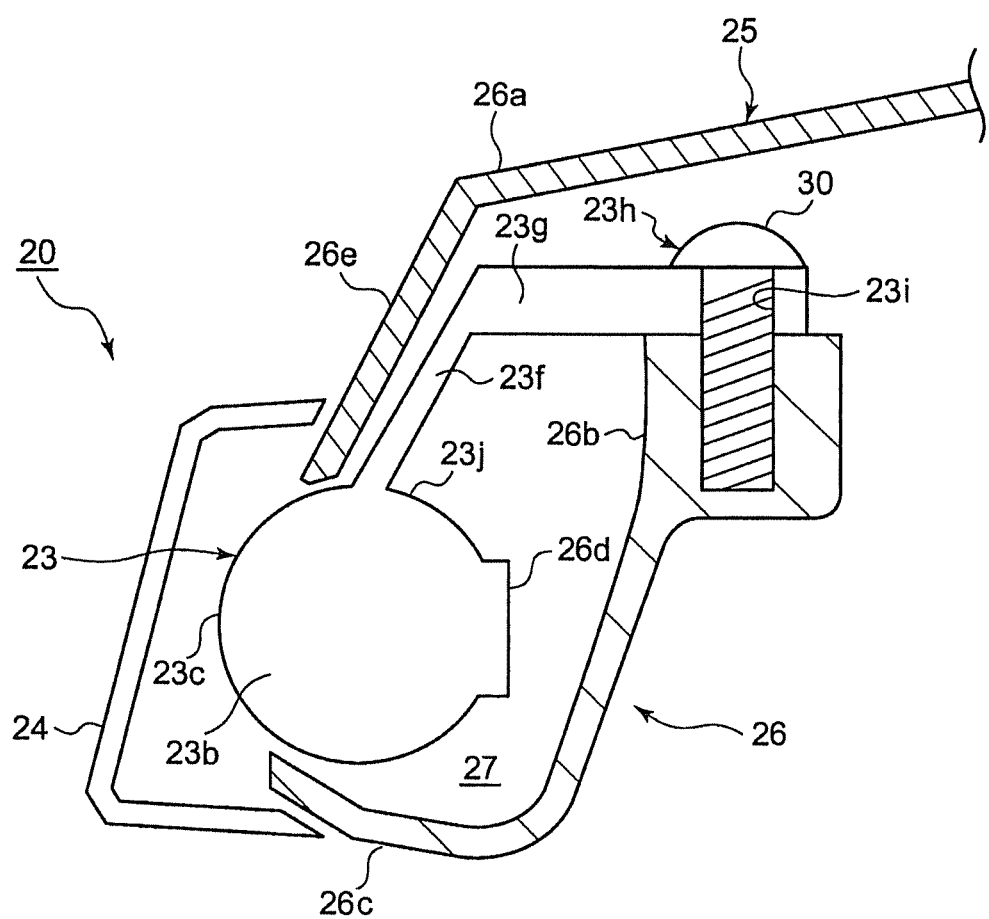
FIG. 4 is an enlarged cross-sectional view of a clearance lamp according to another embodiment of the present invention.

FIG. 4 is an enlarged cross-sectional view of the clearance lamp 20 according to another embodiment of the present invention. Although the clearance lamp shown in FIG. 3 is provided below the low beam lamp and the high beam lamp, the clearance lamp 20 shown in FIG. 4 is provided above the low beam lamp and the high beam lamp. In the embodiment of FIG. 4, those components which are the same as or correspond to those of the clearance lamp shown in FIG. 3 are denoted with the same reference characters, and repetitive description will be omitted as appropriate.

As shown in FIG. 4, the first extended portion 23*f* is extended upward from an upper surface portion 23*j* of the light guide body 23*b*. The second extended portion 23*g* is extended horizontally toward the rear from the extended end of the first extended portion 23*f*, and the second extended portion 23*g* is provided with the fixing portion 23*h* that fixes the light guide 23 to the back surface portion 26*b* of the clearance lamp body 26. Using this fixing/supporting structure of the light guide 23 makes it difficult to see the light emission in a dot pattern, as in the above embodiment shown in FIG. 3. The presence of the fixing/supporting structure is, therefore, less likely to be recognized from the outside, whereby the appearance of the clearance lamp 20 and the appearance of the vehicular headlamp 10 can be further improved.

In the embodiment of FIG. 4, the concealing portion 26*e* is extended from the front end of the upper surface portion 26*a* of the clearance lamp body 26 to the upper surface portion 23*j* of the light guide body 23*b* so as to conceal the first extended portion 23*f*, the second extended portion 23*g*, and the fixing portion 23*h*. The back surface portion 26*b* of the clearance lamp body 26 is also provided so as to at least partially conceal the second extended portion 23*g* and the fixing portion 23*h*. This can make it more difficult to see the fixing/supporting structure of the light guide 23 from the outside of the clearance lamp 20, and the appearance of the clearance lamp 20 and the appearance of the vehicular headlamp 10 can improve further.

In the vehicular headlamp 10 according to the embodiment of FIG. 4 as well, the back surface portion 26*b* of the clearance lamp body 26 which is a reflective member provided behind the light guide body 23*b* serves as the light-guide attaching portion. This can make it more difficult for the fixing/supporting structure of the light guide 23 to be seen.

In the embodiment of FIG. 4, it is preferable that the inner surface of the lower surface portion 26*c* of the clearance lamp body 26 not be a reflective surface. If the inner surface of the lower surface portion 26*c* is a reflective surface, then the light emitted from the first extended portion 23*f* is reflected by the lower surface portion 26*c*, and the fixing/supporting structure may be seen.

The present invention is described above based on the embodiments. However, these embodiments are by way of example only, and it is to be understood by those skilled in the art that various modifications can be made to the combination of each constituent element and each treatment process, and such modifications fall within the scope of the present invention.

For example, although the LED is employed as an example of the light source in the above embodiments, the light source is not limited to LEDs and, for example, a semiconductor laser, a bulb can be used instead.

Although the clearance lamp is shown as an example of the vehicular lamp using a light guide in the embodiments above, the vehicular lamp that uses a light guide is not limited to this, and, for example, a daytime running lamp can be used.

The invention claimed is:

1. A vehicular lamp comprising:
a light-source mount portion on which a light source is mounted;
a light guide for receiving at one end surface thereof light from the light source, said light guide guiding the light therein and emitting the light through an emitting surface that extends in a direction from the one end surface of the light guide at which the light is received to an opposite end surface of the light guide; and
a light-guide attaching portion to which the light guide is attached, wherein
the light guide is comprised of a bar-shaped light guide body, a first extended portion extended downward or upward from the light guide body, a second extended portion extended rearward from an extended end of the first extended portion, and a fixing portion formed in the second extended portion to fix the light guide to the light-guide attaching portion, wherein the first extended portion and the second extended portion are integrally molded to the light guide body by using a transparent resin,
wherein if the first extended portion extends downward, the second extended portion is configured for contacting a bottom surface of the light-guide attaching portion of a clearance lamp body, and
wherein if the first extended portion extends upward, the second extended portion is configured for contacting a top surface of the light-guide attaching portion of the clearance lamp body.

2. The vehicular lamp according to claim 1, further comprising: a concealing portion that conceals the first extended portion, the second extended portion, and the fixing portion.

3. The vehicular lamp according to claim 1, wherein the light-guide attaching portion is a reflective member and is provided behind the light guide body to reflect light from the light guide body.

4. The vehicular lamp according to claim 2, wherein the light-guide attaching portion is a reflective member and is provided behind the light guide body to reflect light from the light guide body.

5. A vehicular lamp comprising:
a light-source mount portion on which a light source is mounted;
a light guide for receiving at one end surface thereof light from the light source, said light guide guiding the light therein and emitting the light through an emitting surface that extends in a direction from the one end surface of the light guide at which the light is received to an opposite end surface of the light guide; and
a light-guide attaching portion to which the light guide is attached, wherein
the light guide is comprised of a bar-shaped light guide body, a first extended portion extended downward or upward from the light guide body, a second extended portion extended rearward from an extended end of the first extended portion, and a fixing portion formed in the second extended portion to fix the light guide to the light-guide attaching portion, wherein the first extended portion and the second extended portion are integrally molded to the light guide body by using a transparent resin,
wherein the second extended portion is a plate piece,
wherein if the first extended portion extends downward, a top surface of the second extended portion is configured for contacting a bottom surface of the light-guide attaching portion of a clearance lamp body, and
wherein if the first extended portion extends upward, a bottom surface of the second extended portion is configured for contacting a top surface of the light-guide attaching portion of the clearance lamp body.

* * * * *